(12) United States Patent
Parvulescu, III et al.

(10) Patent No.: US 12,515,206 B2
(45) Date of Patent: Jan. 6, 2026

(54) RARE EARTH ELEMENT CONTAINING ZEOLITIC MATERIAL HAVING THE AEI FRAMEWORK TYPE AND COATED MONOLITH SUBSTRATE

(71) Applicant: BASF SE, Ludwigshafen (DE)

(72) Inventors: Andrei-Nicolae Parvulescu, III, Ludwigshafen (DE); Robert McGuire, Florham Park, NJ (US); Ulrich Mueller, Ludwigshafen (DE); Weiping Zhang, Liaoning (CN); Chuan Shi, Liaoning (CN)

(73) Assignee: BASF SE, Ludwigshafen (DE)

( * ) Notice: Subject to any disclaimer, the term of this patent is extended or adjusted under 35 U.S.C. 154(b) by 592 days.

(21) Appl. No.: 17/766,578

(22) PCT Filed: Nov. 24, 2020

(86) PCT No.: PCT/CN2020/131162
§ 371 (c)(1),
(2) Date: Apr. 5, 2022

(87) PCT Pub. No.: WO2021/104264
PCT Pub. Date: Jun. 3, 2021

(65) Prior Publication Data
US 2024/0109058 A1    Apr. 4, 2024

(51) Int. Cl.
*B01J 29/76* (2006.01)
*B01D 53/56* (2006.01)
(Continued)

(52) U.S. Cl.
CPC .............. *B01J 29/76* (2013.01); *B01D 53/56* (2013.01); *B01D 53/9418* (2013.01);
(Continued)

(58) Field of Classification Search
CPC ................ B01D 53/56; B01D 53/9418; B01D 2251/2062; B01D 2255/2061;
(Continued)

(56) References Cited

U.S. PATENT DOCUMENTS 10,744,459 B2 *  8/2020  Hoke ..................... F01N 3/2828
11,077,432 B2 *  8/2021  Lin ......................... B01J 35/399
(Continued)

FOREIGN PATENT DOCUMENTS

CN          105984876 A     10/2016
CN          106925341 A      7/2017
(Continued)

OTHER PUBLICATIONS

CN 106984357 (Year: 2024).*
(Continued)

*Primary Examiner* — Dapinder Singh
(74) *Attorney, Agent, or Firm* — Lowenstein Sandler LLP (57) ABSTRACT

A rare earth element containing zeolitic material having an AEI-type framework structure, the framework structure of the zeolitic material comprising $SiO_2$ and $X_2O_3$, X being a trivalent element, wherein the zeolitic material contains one or more rare earth elements as counter-ions at the ion exchange sites of the framework structure, and wherein the zeolitic material is obtainable and/or obtained according to a process involving the hydrothermal treatment of the rare earth element containing zeolitic material at a temperature in the range of from 400 to 1,000° C. A coated monolith substrate comprising a rare earth element containing zeolitic material having an AEI-type framework structure, wherein the zeolitic material is supported on the monolith substrate. A process for the production of a coated monolith substrate comprising a rare earth element containing zeolitic material having an AEI-type framework structure.

19 Claims, 5 Drawing Sheets

(51) Int. Cl.
  *B01D 53/94* (2006.01)
  *B01J 35/00* (2006.01)
  *B01J 37/08* (2006.01)
  *B01J 37/30* (2006.01)
  *C01B 39/02* (2006.01)

(52) U.S. Cl.
  CPC .............. *B01J 35/19* (2024.01); *B01J 37/08* (2013.01); *B01J 37/30* (2013.01); *C01B 39/02* (2013.01); *B01D 2255/2061* (2013.01); *B01D 2255/20761* (2013.01); *B01D 2255/50* (2013.01); *B01J 2235/05* (2024.01); *B01J 2235/15* (2024.01)

(58) Field of Classification Search
  CPC ....... B01D 2255/20761; B01D 2255/50; B01J 29/76; B01J 29/763; B01J 35/19; B01J 35/30; B01J 37/08; B01J 37/30; C01B 39/02; F01N 3/2066; F01N 2330/06; F01N 2370/04; F01N 2510/063; F01N 2510/068; Y02A 50/20; Y02C 20/10; Y02T 10/12

See application file for complete search history.

(56) References Cited

U.S. PATENT DOCUMENTS

| | | | |
|---|---|---|---|
| 2014/0271426 A1* | 9/2014 | Casci | B01J 29/7615 422/171 |
| 2018/0093257 A1 | 4/2018 | Chen et al. | |
| 2019/0270081 A1* | 9/2019 | Ilinich | B01J 20/041 |
| 2023/0077564 A1* | 3/2023 | Avis | B01J 35/56 502/345 |
| 2023/0130212 A1* | 4/2023 | Avis | B01D 53/9418 502/65 |

FOREIGN PATENT DOCUMENTS

| | | |
|---|---|---|
| CN | 106984357 A | 7/2017 |
| CN | 108097301 A | 6/2018 |
| CN | 108126743 A | 6/2018 |
| CN | 108187737 A | 6/2018 |
| CN | 108246359 A | 7/2018 |
| CN | 108273549 A | 7/2018 |
| CN | 108325557 A | 7/2018 |
| CN | 108786911 A | 11/2018 |
| CN | 110404580 A | 11/2019 |
| JP | 2014506182 A | 3/2014 |
| JP | 2019510620 A | 4/2019 |
| JP | 2019513537 A | 5/2019 |
| WO | 2019223761 A1 | 11/2019 |
| WO | 2018168787 A1 | 3/2020 |

OTHER PUBLICATIONS

CN 110404580 (Year: 2024).*
Zhao, Z., et al., "Cu-exchanged Al-rich SSZ-13 zeolite from organotemplate-free synthesis as NH 3-SCR catalyst: Effects of Na + ions on the activity and hydrothermal stability", Applied Catalysis B: Environmental, vol. 217, pp. 421-428, 2017.
Wang, J., et al., "Cerium-Stabilized Cu-SSZ-13 Catalyst for the Catalytic Removal of NOx by NH3", Industrial Engineering and Chemical Research, vol. 55, pp. 1174-1182, 2016.
Iwasaki, M. et al., "Hydrothermal stability enhancement by sequential ion-exchange of rare earth metals on Fe/BEA zeolites used as NO reduction catalysts", Chemical Communications, vol. 47, pp. 3966-3968, 2011.
Shu, Y. et al., "Effect of Ionic Radius of Rare Earth on USY Zeolite in Fluid Catalytic Cracking: Fundamentals and Commercial Application", Top Catal, vol. 58, pp. 334-342, 2015.
Zhao, Z. et al., "Rare-earth ion exchanged Cu-SSZ-13 zeolite from organotemplate-free synthesis with enhanced hydrothermal stability in NH3-SCR of NOx", Catalysis Science and Technology, vol. 99, pp. 241-251, 2019.
International Search Report on International Patent Application No. PCT/CN2020/131162 filed on Nov. 24, 2020, dated Feb. 2, 2021, 4 pages.

* cited by examiner

RARE EARTH ELEMENT CONTAINING ZEOLITIC MATERIAL HAVING THE AEI FRAMEWORK TYPE AND COATED MONOLITH SUBSTRATE

TECHNICAL FIELD

The present invention relates to a rare earth element containing zeolitic material having an AEI-type framework structure, wherein the zeolitic material is obtainable and/or obtained according to a process involving the hydrothermal treatment of the rare earth element containing zeolitic material at a temperature in the range of from 400 to 1,000° C. Further, the present invention relates to a coated monolith substrate comprising a rare earth element containing zeolitic material having an AEI-type framework structure, wherein the zeolitic material is supported on the monolith substrate. Yet further, the present invention relates to a process for the production of a coated monolith substrate comprising a rare earth element containing zeolitic material having an AEI-type framework structure.

INTRODUCTION $NH_3$—SCR is the most effective technique for NOx abatement in lean-burning engine exhaust aftertreatment. In this regard, Cu—SSZ-13 has been commercialized as $NH_3$—SCR catalyst for its significant advantages of excellent catalytic performance and hydrothermal stability. However, with more and more stringent restriction on engine exhaust, especially for vehicles under cold start conditions, further enhancing the low-temperature $NH_3$—SCR activity and hydrothermal stability of SCR catalysts is highly desirable.

Zhao, Z. et al., *Appl. Catal. B: Environ.* 2017, 217, 421-428 relates to the enhancement of the low-temperature activity as well as the hydrothermal stability of Cu exchanged Al-rich SSZ-13 zeolite using sodium. Wang, J. et al., *Ind. Eng. Chem. Res.* 2016, 55, 1174-1182 concerns cerium-stabilized Cu—SSZ13 and its use as a catalyst in SCR. Iwasaki, M. et al., *Chem. Commun.* 2011, 47, 3966-3968 relates to the use of rare-earth ions with diameters of 1.05 to 1.15 angstroms for improving the hydrothermal stability of Fe-Beta zeolite and its use in SCR.

Shu, Y. et al., *Top Catal* 2015, 58, 334-342, on the other hand, concerns the use of rare-earth ions to enhance the hydrothermal stability of Y zeolites used as FCC catalysts.

Among SSZ-13 zeolites with similar Cu loadings, Al-rich SSZ-13, i.e. SSZ-13 displaying low molar ratios of silica to alumina, tends to show higher activity in SCR. Elevating Al content in SSZ-13 zeolite may therefore be a promising method to enhance both the low- and high-temperature activity. However, the major problem of Al-rich SSZ-13 zeolite is that due to its high aluminum content, it has low hydrothermal stability, and the low-temperature activity is significantly degraded after deep hydrothermal aging. Consequently, the relatively low hydrothermal stability of Al-rich Cu—SSZ-13 catalysts hinders their practical application for $NH_3$—SCR reaction.

In view thereof, Zhao, Z. et al., *Catal. Sci. Technol.* 2019, 9, 241-251 proposes rare earth ion-exchanged Cu—SSZ-13 zeolite from organotemplate-free synthesis, which displays an enhanced hydrothermal stability in $NH_3$—SCR.

There however remains a need for an improved catalyst material, in particular for use in SCR, not only with regard to hydrothermal stability, but also with regard to catalytic activity and selectivity under the different reaction conditions encountered, as well as with regard to resistance of the catalyst material to other negative factors such as catalyst poisoning, and in particular sulfur poisoning of the catalyst.

DETAILED DESCRIPTION

It was therefore the object of the present invention to provide an improved zeolitic material having, in particular with regard to its hydrothermal stability and catalytic properties. Furthermore, it was an object of the present invention to provide an improved catalyst, in particular for use in the selective catalytic reduction (SCR) of $NO_x$. Said objects are achieved by the rare earth element containing zeolitic material having an AEI-type framework structure according to the present invention, as well as by the inventive method for their production and by their use as a catalyst, in particular in SCR. Thus, it has surprisingly been found that by including a rare earth element in a zeolitic material having an AEI-type framework structure, a sudden collapse from severe hydrothermal aging may be prevented. Furthermore, it has quite surprisingly been found that by including a rare earth element in a zeolitic material having an AEI-type framework structure, the resistance of zeolitic materials having an AEI-type framework structure, and in particular of zeolite catalysts having an AEI-type framework structure, to chemical poisoning such as by $SO_2$ may be considerably increased.

Thus, the present invention relates to a coated monolith substrate comprising a rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, and wherein the zeolitic material is supported on the monolith substrate.

No particular restriction applies with respect to the physical or chemical nature of the monolith substrate. Thus, any monolith substrate may be used as long as it is suitable for being coated, in particular with a washcoat layer. It is preferred that the monolith substrate is a wall-flow monolith substrate or a flow-through monolith substrate.

In the case where the monolith substrate is a flow-through substrate, it is preferred that the flow-through monolith substrate is a honeycomb monolith substrate.

In the case where the monolith substrate is a wall-flow substrate, it is preferred that the wall-flow monolith substrate is a honeycomb monolith substrate having adjacent channels which are alternatively plugged at their inlet and outlet ends.

As disclosed above, no particular restriction applies with respect to the physical or chemical nature of the monolith substrate. Thus, the monolith may be composed of any suitable material. It is preferred that the monolith substrate is a ceramic and/or a metal monolith substrate, wherein preferably the monolith substrate comprises cordierite and/or silicon carbide, preferably cordierite, wherein more preferably the monolith substrate consists of cordierite and/or silicon carbide, preferably of cordierite.

The zeolitic material may be supported on the monolith substrate by any conceivable means. It is preferred that the zeolitic material is supported on the monolith substrate as, or as a component of, a washcoat layer.

Further, the present invention relates to a rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, and wherein the zeolitic material is obtainable and/or obtained according to a process involving a hydrothermal treatment of the rare earth element containing zeolitic material at a temperature in the range of from 400 to 1,000° C.

It is preferred that the zeolitic material is obtainable and/or obtained according to a process involving the hydrothermal treatment of the rare earth element containing zeolitic material at a temperature in the range of from 500 to 980° C., preferably of from 600 to 960° C., more preferably of from 700 to 940° C., more preferably of from 800 to 920° C., and more preferably of from 850 to 900° C.

No particular restriction applies with respect to the duration of the hydrothermal treatment. It is preferred that the zeolitic material is obtainable and/or obtained according to a process involving the hydrothermal treatment of the rare earth element containing zeolitic material for a duration in the range of from 0.5 to 72 h, preferably of from 1 to 48 h, more preferably of from 2 to 24 h, more preferably of from 3 to 20 h, more preferably of from 4 to 16 h, more preferably of from 5 to 12 h, and more preferably of from 6 to 8 h.

It is preferred that the zeolitic material is obtainable and/or obtained according to a process involving the hydrothermal treatment of the rare earth element containing zeolitic material in an atmosphere containing from 1 to 25 vol.-% $H_2O$, preferably from 3 to 20 vol.-%, more preferably from 5 to 15 vol.-%, more preferably from 7 to 13 vol.-%, and more preferably from 9 to 11 vol.-% $H_2O$.

In the case where the zeolitic material is obtainable and/or obtained according to a process involving the hydrothermal treatment of the rare earth element containing zeolitic material in an atmosphere containing from 1 to 25 vol.-% $H_2O$, it is preferred that the zeolitic material is obtainable and/or obtained according to a process involving the hydrothermal treatment of the rare earth element containing zeolitic material in an atmosphere containing air, preferably in air.

No particular restriction applies with respect to the $SiO_2$:$X_2O_3$ molar ratio of the zeolitic material of the coated monolith substrate or of the rare earth element containing zeolitic material having an AEI-type framework structure as disclosed herein. It is preferred that the zeolitic material of the coated monolith substrate or of the rare earth element containing zeolitic material having an AEI-type framework structure displays an $SiO_2$:$X_2O_3$ molar ratio in the range of from 6 to 200, preferably of from 8 to 100, more preferably of from 10 to 50, more preferably of from 13 to 30, more preferably of from 15 to 25, more preferably of from 17 to 23, and more preferably of from 19 to 21.

Further, no particular restriction applies with respect to X of the zeolitic material of the coated monolith substrate or of the rare earth element containing zeolitic material having an AEI-type framework structure as disclosed herein. It is preferred that X of the zeolitic material of the coated monolith substrate or of the rare earth element containing zeolitic material having an AEI-type framework structure is selected from the group consisting of Al, B, In, Ga, and combinations of two or more thereof. It is particularly preferred that X of the zeolitic material of the coated monolith substrate or of the rare earth element containing zeolitic material having an AEI-type framework structure is Al.

It is preferred that the effective ionic radius of the one or more rare earth elements contained as counter-ions at the ion exchange sites of the framework structure of the zeolitic material of the coated monolith substrate or of the rare earth element containing zeolitic material having an AEI-type framework structure is 1.3 angstroms or less, preferably 1.25 angstroms or less, more preferably 1.2 angstroms or less, more preferably 1.15 angstroms or less, more preferably 1.1 angstroms or less, more preferably 1.05 angstroms or less, more preferably 1.0 angstroms or less, more preferably 0.95 angstroms or less, more preferably 0.9 angstroms or less, and more preferably 0.88 angstroms or less.

It is preferred that the one or more rare earth elements of the zeolitic material of the coated monolith substrate or of the rare earth element containing zeolitic material having an AEI-type framework structure are selected from the group consisting of La, Ce, Pr, Nd, Sm, Eu, Gd, Tb, Dy, Ho, Er, Tm, Yb, Lu, Y, and Sc, including combinations of two or more thereof, preferably from the group consisting of Pr, Nd, Sm, Eu, Gd, Tb, Dy, Ho, Er, Tm, Yb, Lu, Y, and Sc, including combinations of two or more thereof, more preferably from the group consisting of Sm, Eu, Gd, Tb, Dy, Ho, Er, Tm, Yb, Lu, Y, and Sc, including combinations of two or more thereof, more preferably from the group consisting of Yb, Lu, Y, and Sc, including combinations of two or more thereof, wherein more preferably the one or more rare earth elements are Y and/or Yb, preferably Y.

It is preferred that the one or more rare earth elements contained as counter-ions at the ion exchange sites of the zeolitic material of the coated monolith substrate or of the rare earth element containing zeolitic material having an AEI-type framework structure are in the oxidation state +2 and/or +3, preferably in the oxidation state +3.

It is preferred that the one or more rare earth elements of the zeolitic material of the coated monolith substrate or of the rare earth element containing zeolitic material having an AEI-type framework structure are contained in the zeolitic material in an amount in the range of from 0.1 to 7 wt.-%, based on 100 wt.-% of $SiO_2$ contained in the zeolitic material, preferably of from 0.3 to 5 wt.-%, more preferably of from 0.5 to 4.5 wt.-%, more preferably of from 0.7 to 4 wt.-%, more preferably of from 0.9 to 3.5 wt.-%, more preferably of from 1.1 to 3 wt.-%, more preferably of from 1.3 to 2.5 wt.-%, more preferably of from 1.5 to 2.2 wt.-%, and more preferably of from 1.6 to 2 wt.-%.

It is preferred that the molar ratio RE:$X_2O_3$ of the one or more rare earth elements (RE) calculated as the element to $X_2O_3$ contained in the zeolitic material of the coated monolith substrate or of the rare earth element containing zeolitic material having an AEI-type framework structure is in the range of from 0.1 to 2, preferably of from 0.15 to 1.2, more preferably of from 0.18 to 0.8, more preferably of from 0.2 to 0.5, more preferably of from 0.22 to 0.35, more preferably of from 0.24 to 0.3, and more preferably of from 0.26 to 0.28.

It is preferred that the zeolitic material of the coated monolith substrate or of the rare earth element containing zeolitic material having an AEI-type framework structure further contains one or more transition metal elements M selected from the group consisting of Cr, Fe, Co, Ni, Cu, Zn, Pd, and Pt, including combinations of two or more thereof, as counter-ions at the ion exchange sites of the framework structure, wherein preferably the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu.

In the case where the zeolitic material of the coated monolith substrate or of the rare earth element containing zeolitic material having an AEI-type framework structure further contains one or more transition metal elements M selected from the group consisting of Cr, Fe, Co, Ni, Cu, Zn, Pd, and Pt, including combinations of two or more thereof, as counter-ions at the ion exchange sites of the framework structure, it is preferred that the one or more transition metal elements M contained as counter-ions at the ion exchange sites are in the oxidation state +2 and/or +3, preferably in the oxidation state +2.

Further in the case where the zeolitic material of the coated monolith substrate or of the rare earth element containing zeolitic material having an AEI-type framework structure further contains one or more transition metal elements M selected from the group consisting of Cr, Fe, Co, Ni, Cu, Zn, Pd, and Pt, including combinations of two or more thereof, as counter-ions at the ion exchange sites of the framework structure, it is preferred that the one or more transition metal elements M are contained in the zeolitic material in an amount in the range of from 0.5 to 10 wt.-% based on 100 wt.-% of $SiO_2$ contained in the zeolitic material, preferably of from 0.8 to 7 wt.-%, more preferably of from 1 to 5 wt.-%, more preferably of from 1.2 to 3.5 wt.-%, more preferably of from 1.5 to 3 wt.-%, more preferably of from 1.8 to 2.8 wt.-%, more preferably of from 2 to 2.6 wt.-%, and more preferably of from 2.2 to 2.4 wt.-%.

Further in the case where the zeolitic material of the coated monolith substrate or of the rare earth element containing zeolitic material having an AEI-type framework structure further contains one or more transition metal elements M selected from the group consisting of Cr, Fe, Co, Ni, Cu, Zn, Pd, and Pt, including combinations of two or more thereof, as counter-ions at the ion exchange sites of the framework structure, it is preferred that the molar ratio $M:X_2O_3$ of the one or more transition metal elements M calculated as the element to $X_2O_3$ contained in the zeolitic material is in the range of from 0.01 to 3, preferably of from 0.05 to 2, more preferably of from 0.1 to 1.5, more preferably of from 0.3 to 1, more preferably of from 0.4 to 0.8, more preferably of from 0.45 to 0.6, and more preferably of from 0.48 to 0.5.

It is preferred that the zeolitic material of the coated monolith substrate or of the rare earth element containing zeolitic material having an AEI-type framework structure comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

It is preferred that the framework of the zeolitic material of the coated monolith substrate or of the rare earth element containing zeolitic material having an AEI-type framework structure contains substantially no phosphorous, wherein preferably the zeolitic material contains substantially no phosphorous and/or phosphorous containing compounds.

Yet further, the present invention relates to a process for the production of a coated monolith substrate comprising a rare earth element containing zeolitic material having an AEI-type framework structure, the framework structure of the zeolitic material comprising $SiO_2$ and $X_2O_3$, wherein X stands for a trivalent element, the process comprising
(1) providing a zeolitic material having an AEI-type framework structure, the framework structure of the zeolitic material comprising $SiO_2$ and $X_2O_3$;
(2) optionally subjecting the zeolitic material provided in (1) to one or more ion exchange procedures with $H^+$ and/or $NH_4^+$, preferably with $NH_4^+$;
(3) subjecting the zeolitic material provided in (1) or obtained in (2) to one or more ion exchange procedures with one or more rare earth elements;
(4) optionally subjecting the zeolitic material obtained in (3) to one or more ion exchange procedures with one or more transition metal elements M; and
(5) providing the zeolitic material obtained according to (3) or (4) onto a monolith substrate, wherein the zeolitic material is preferably provided as, or as a component of, a washcoat layer onto the monolith substrate.

It is preferred that the monolith substrate is a wall-flow monolith substrate or a flow-through monolith substrate.

In the case where the monolith substrate is a flow-through substrate, it is preferred that the flow-through monolith substrate is a honeycomb monolith substrate.

In the case where the monolith substrate is a wall-flow substrate, it is preferred that the wall-flow monolith substrate is a honeycomb monolith substrate having adjacent channels which are alternatively plugged at their inlet and outlet ends.

It is preferred that the monolith substrate is a ceramic and/or a metal monolith substrate, wherein more preferably the monolith substrate comprises cordierite and/or silicon carbide, preferably cordierite, wherein more preferably the monolith substrate consists of cordierite and/or silicon carbide, preferably of cordierite.

No particular restriction applies with respect to the $SiO_2:X_2O_3$ molar ratio of the zeolitic material provided in (1). It is preferred that the zeolitic material provided in (1) displays an $SiO_2:X_2O_3$ molar ratio in the range of from 6 to 200, more preferably of from 8 to 100, more preferably of from 10 to 50, more preferably of from 13 to 30, more preferably of from 15 to 25, more preferably of from 17 to 23, and more preferably of from 19 to 21.

It is preferred that X is selected from the group consisting of Al, B, In, Ga, and combinations of two or more thereof. It is particularly preferred that X is Al.

It is preferred that in (3) the one or more rare earth elements are selected from the group consisting of Y, La, Ce, Sm, and Yb, including combinations of two or more thereof, more preferably from the group consisting of Y, La, Sm, and Yb, including combinations of two or more thereof, wherein more preferably the one or more rare earth elements are Y and/or Yb, preferably Y.

It is preferred that in (3) the one or more rare earth elements contained as counter-ions at the ion exchange sites are in the oxidation state +3.

It is preferred that the zeolitic material having an AEI-type framework structure provided in (1) comprises one or more zeolites selected from the group consisting of SSZ-39, SAPO-18, and SIZ-8, including mixtures of two or more thereof, wherein more preferably the zeolitic material comprises SSZ-39, wherein more preferably the zeolitic material is SSZ-39.

It is preferred that the framework of the zeolitic material provided in (1) contains substantially no phosphorous, wherein more preferably the zeolitic material provided in (1) contains substantially no phosphorous and/or phosphorous containing compounds.

It is preferred that the one or more transition metal elements M are selected from the group consisting of Cr, Fe, Co, Ni, Cu, Zn, Pd, and Pt, including mixtures of two or more thereof, wherein more preferably the one or more transition metal elements M are selected from the group consisting of Fe, Cu, Pd, and Pt, including mixtures of two or more thereof, more preferably from the group consisting of Fe, Cu, and Pd, including mixtures of two or more thereof, wherein more preferably the one or more transition metal elements M are Fe and/or Cu, preferably Cu.

It is preferred that the one or more transition metal elements M are in the oxidation state +2.

Yet further, the present invention relates to a coated monolith substrate as obtainable and/or obtained according to the process of any one of the embodiments disclosed herein.

Yet further, the present invention relates to an emissions treatment system for treating exhaust gas from a combustion engine, preferably from a diesel engine or from a lean burn gasoline engine, wherein the emissions treatment system comprises a coated monolith substrate or a the rare earth element containing zeolitic material according to any one of the embodiments disclosed herein.

Yet further, the present invention relates to a use of the coated monolith substrate or of the rare earth element containing zeolitic material according to any one of the embodiments disclosed herein as a molecular sieve, as an adsorbent, for ion-exchange, as a catalyst or a precursor thereof, and/or as a catalyst support or a precursor thereof, preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides NO, in exhaust gas from a combustion engine, preferably from a diesel engine or from a lean burn gasoline engine.

The unit bar(abs) refers to an absolute pressure of $10^5$ Pa and the unit Angstrom refers to a length of $10^{-10}$ m.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A coated monolith substrate comprising a rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, and wherein the zeolitic material is supported on the monolith substrate.
2. The coated monolith substrate of embodiment 1, wherein the monolith substrate is a wall-flow monolith substrate or a flow-through monolith substrate.
3. The coated monolith substrate of embodiment 2, wherein the flow-through monolith substrate is a honeycomb monolith substrate.
4. The coated monolith substrate of embodiment 2, wherein the wall-flow monolith substrate is a honeycomb monolith substrate having adjacent channels which are alternatively plugged at their inlet and outlet ends.
5. The coated monolith substrate of any of embodiments 1 to 4, wherein the monolith substrate is a ceramic and/or a metal monolith substrate, wherein preferably the monolith substrate comprises cordierite and/or silicon carbide, preferably cordierite, wherein more preferably the monolith substrate consists of cordierite and/or silicon carbide, preferably of cordierite.
6. The coated monolith substrate of any of embodiments 1 to 5, wherein the zeolitic material is supported on the monolith substrate as, or as a component of, a washcoat layer.
7. A rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, and wherein the zeolitic material is obtainable and/or obtained according to a process involving the hydrothermal treatment of the rare earth element containing zeolitic material at a temperature in the range of from 400 to 1,000° C.
8. The zeolitic material of embodiment 7, wherein the zeolitic material is obtainable and/or obtained according to a process involving the hydrothermal treatment of the rare earth element containing zeolitic material at a temperature in the range of from 500 to 980° C., preferably of from 600 to 960° C., more preferably of from 700 to 940° C., more preferably of from 800 to 920° C., and more preferably of from 850 to 900° C.
9. The zeolitic material of embodiment 7 or 8, wherein the zeolitic material is obtainable and/or obtained according to a process involving the hydrothermal treatment of the rare earth element containing zeolitic material for a duration in the range of from 0.5 to 72 h, preferably of from 1 to 48 h, more preferably of from 2 to 24 h, more preferably of from 3 to 20 h, more preferably of from 4 to 16 h, more preferably of from 5 to 12 h, and more preferably of from 6 to 8 h.
10. The zeolitic material of any of embodiments 7 to 9, wherein the zeolitic material is obtainable and/or obtained according to a process involving the hydrothermal treatment of the rare earth element containing zeolitic material in an atmosphere containing from 1 to 25 vol.-% $H_2O$, preferably from 3 to 20 vol.-%, more preferably from 5 to 15 vol.-%, more preferably from 7 to 13 vol.-%, and more preferably from 9 to 11 vol.-% $H_2O$.
11. The zeolitic material of embodiment 10, wherein the zeolitic material is obtainable and/or obtained according to a process involving the hydrothermal treatment of the rare earth element containing zeolitic material in an atmosphere containing air.
12. The coated monolith substrate or the zeolitic material of any of embodiments 1 to 11, wherein the zeolitic material displays an $SiO_2:X_2O_3$ molar ratio in the range of from 6 to 200, preferably of from 8 to 100, more preferably of from 10 to 50, more preferably of from 13 to 30, more preferably of from 15 to 25, more preferably of from 17 to 23, and more preferably of from 19 to 21.

13. The coated monolith substrate or the zeolitic material of any of embodiments 1 to 12, wherein X is selected from the group consisting of Al, B, In, Ga, and combinations of two or more thereof, X preferably being Al.

14. The coated monolith substrate or the zeolitic material of any of embodiments 1 to 13, wherein the effective ionic radius of the one or more rare earth elements contained as counter-ions at the ion exchange sites of the framework structure of the zeolitic material is 1.3 angstroms or less, preferably 1.25 angstroms or less, more preferably 1.2 angstroms or less, more preferably 1.15 angstroms or less, more preferably 1.1 angstroms or less, more preferably 1.05 angstroms or less, more preferably 1.0 angstroms or less, more preferably 0.95 angstroms or less, more preferably 0.9 angstroms or less, and more preferably 0.88 angstroms or less.

15. The coated monolith substrate or the zeolitic material of any of embodiments 1 to 14, wherein the one or more rare earth elements are selected from the group consisting of La, Ce, Pr, Nd, Sm, Eu, Gd, Tb, Dy, Ho, Er, Tm, Yb, Lu, Y, and Sc, including combinations of two or more thereof, preferably from the group consisting of Pr, Nd, Sm, Eu, Gd, Tb, Dy, Ho, Er, Tm, Yb, Lu, Y, and Sc, including combinations of two or more thereof, more preferably from the group consisting of Sm, Eu, Gd, Tb, Dy, Ho, Er, Tm, Yb, Lu, Y, and Sc, including combinations of two or more thereof, more preferably from the group consisting of Yb, Lu, Y, and Sc, including combinations of two or more thereof, wherein more preferably the one or more rare earth elements are Y and/or Yb, preferably Y.

16. The coated monolith substrate or the zeolitic material of any of embodiments 1 to 15, wherein the one or more rare earth elements contained as counter-ions at the ion exchange sites are in the oxidation state +2 and/or +3, preferably in the oxidation state +3.

17. The coated monolith substrate or the zeolitic material of any of embodiments 1 to 16, wherein the one or more rare earth elements are contained in the zeolitic material in an amount in the range of from 0.1 to 7 wt.-%, based on 100 wt.-% of $SiO_2$ contained in the zeolitic material, preferably of from 0.3 to 5 wt.-%, more preferably of from 0.5 to 4.5 wt.-%, more preferably of from 0.7 to 4 wt.-%, more preferably of from 0.9 to 3.5 wt.-%, more preferably of from 1.1 to 3 wt.-%, more preferably of from 1.3 to 2.5 wt.-%, more preferably of from 1.5 to 2.2 wt.-%, and more preferably of from 1.6 to 2 wt.-%.

18. The coated monolith substrate or the zeolitic material of any of embodiments 1 to 17, wherein the molar ratio RE:$X_2O_3$ of the one or more rare earth elements (RE) calculated as the element to $X_2O_3$ contained in the zeolitic material is in the range of from 0.1 to 2, preferably of from 0.15 to 1.2, more preferably of from 0.18 to 0.8, more preferably of from 0.2 to 0.5, more preferably of from 0.22 to 0.35, more preferably of from 0.24 to 0.3, and more preferably of from 0.26 to 0.28.

19. The coated monolith substrate or the zeolitic material of any of embodiments 1 to 18, wherein the zeolitic material further contains one or more transition metal elements M selected from the group consisting of Cr, Fe, Co, Ni, Cu, Zn, Pd, and Pt, including combinations of two or more thereof, as counter-ions at the ion exchange sites of the framework structure, wherein preferably the one or more transition metal elements are selected from the group consisting of Fe, Cu, Pd, and Pt, including combinations of two or more thereof, more preferably from the group consisting of Fe, Cu, and Pd, including combinations of two or more thereof, wherein more preferably the zeolitic material further contains Fe and/or Cu, preferably Cu.

20. The coated monolith substrate or the zeolitic material of embodiment 19, wherein the one or more transition metal elements M contained as counter-ions at the ion exchange sites are in the oxidation state +2 and/or +3, preferably in the oxidation state +2.

21. The coated monolith substrate or the zeolitic material of embodiment 19 or 20, wherein the one or more transition metal elements M are contained in the zeolitic material in an amount in the range of from 0.5 to 10 wt.-% based on 100 wt.-% of $SiO_2$ contained in the zeolitic material, preferably of from 0.8 to 7 wt.-%, more preferably of from 1 to 5 wt.-%, more preferably of from 1.2 to 3.5 wt. %, more preferably of from 1.5 to 3 wt.-%, more preferably of from 1.8 to 2.8 wt.-%, more preferably of from 2 to 2.6 wt.-%, and more preferably of from 2.2 to 2.4 wt.-%.

22. The coated monolith substrate or the zeolitic material of any of embodiments 19 to 21, wherein the molar ratio M:$X_2O_3$ of the one or more transition metal elements M calculated as the element to $X_2O_3$ contained in the zeolitic material is in the range of from 0.01 to 3, preferably of from 0.05 to 2, more preferably of from 0.1 to 1.5, more preferably of from 0.3 to 1, more preferably of from 0.4 to 0.8, more preferably of from 0.45 to 0.6, and more preferably of from 0.48 to 0.5.

23. The coated monolith substrate or the zeolitic material of any of embodiments 1 to 22, wherein the zeolitic material having an AEI-type framework structure comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

24. The coated monolith substrate or the zeolitic material of any of embodiments 1 to 23, wherein the framework of the zeolitic material contains substantially no phosphorous, wherein preferably the zeolitic material contains substantially no phosphorous and/or phosphorous containing compounds.

25. A process for the production of a coated monolith substrate comprising a rare earth element containing zeolitic material having an AEI-type framework structure, the framework structure of the zeolitic material comprising $SiO_2$ and $X_2O_3$, wherein X stands for a trivalent element, comprising
  (1) providing a zeolitic material having an AEI-type framework structure, the framework structure of the zeolitic material comprising $SiO_2$ and $X_2O_3$;
  (2) optionally subjecting the zeolitic material provided in (1) to one or more ion exchange procedures with $H^+$ and/or $NH_4^+$, preferably with $NH_4^+$;
  (3) subjecting the zeolitic material provided in (1) or obtained in (2) to one or more ion exchange procedures with one or more rare earth elements;
  (4) optionally subjecting the zeolitic material obtained in (3) to one or more ion exchange procedures with one or more transition metal elements M; and (5) providing the zeolitic material obtained according to (3) or (4) onto a monolith substrate, wherein the zeolitic material is preferably provided as, or as a component of, a washcoat layer onto the monolith substrate.

26. The process of embodiment 25, wherein the monolith substrate is a wall-flow monolith substrate or a flow-through monolith substrate.

27. The process of embodiment 26, wherein the flow-through monolith substrate is a honeycomb monolith substrate.

28. The process of embodiment 26, wherein the wall-flow monolith substrate is a honeycomb monolith substrate having adjacent channels which are alternatively plugged at their inlet and outlet ends.

29. The process of any of embodiments 25 to 28, wherein the monolith substrate is a ceramic and/or a metal monolith substrate, wherein preferably the monolith substrate comprises cordierite and/or silicon carbide, preferably cordierite, wherein more preferably the monolith substrate consists of cordierite and/or silicon carbide, preferably of cordierite.

30. The process of any of embodiments 25 to 29, wherein the zeolitic material provided in (1) displays an $SiO_2$:$X_2O_3$ molar ratio in the range of from 6 to 200, preferably of from 8 to 100, more preferably of from 10 to 50, more preferably of from 13 to 30, more preferably of from 15 to 25, more preferably of from 17 to 23, and more preferably of from 19 to 21.

31. The process of any of embodiments 25 to 30, wherein X is selected from the group consisting of Al, B, In, Ga, and combinations of two or more thereof, X preferably being Al.

32. The process of any of embodiments 25 to 31, wherein in (3) the one or more rare earth elements are selected from the group consisting of Y, La, Ce, Sm, and Yb, including combinations of two or more thereof, preferably from the group consisting of Y, La, Sm, and Yb, including combinations of two or more thereof, wherein more preferably the one or more rare earth elements are Y and/or Yb, preferably Y.

33. The process of any of embodiments 25 to 32, wherein in (3) the one or more rare earth elements contained as counter-ions at the ion exchange sites are in the oxidation state +3.

34. The process of any of embodiments 25 to 33, wherein the zeolitic material having an AEI-type framework structure provided in (1) comprises one or more zeolites selected from the group consisting of SSZ-39, SAPO-18, and SIZ-8, including mixtures of two or more thereof, wherein preferably the zeolitic material comprises SSZ-39, wherein more preferably the zeolitic material is SSZ-39.

35. The process of any of embodiments 25 to 34, wherein the framework of the zeolitic material provided in (1) contains substantially no phosphorous, wherein preferably the zeolitic material provided in (1) contains substantially no phosphorous and/or phosphorous containing compounds.

36. The process of any of embodiments 25 to 35, wherein the one or more transition metal elements M are selected from the group consisting of Cr, Fe, Co, Ni, Cu, Zn, Pd, and Pt, including mixtures of two or more thereof, wherein preferably the one or more transition metal elements M are selected from the group consisting of Fe, Cu, Pd, and Pt, including mixtures of two or more thereof, more preferably from the group consisting of Fe, Cu, and Pd, including mixtures of two or more thereof, wherein more preferably the one or more transition metal elements M are Fe and/or Cu, preferably Cu.

37. The process of any of embodiments 25 to 36, wherein the one or more transition metal elements M are in the oxidation state +2.

38. A coated monolith substrate as obtainable and/or obtained according to the process of any one of embodiments 25 to 37.

39. An emissions treatment system for treating exhaust gas from a combustion engine, preferably from a diesel engine or from a lean burn gasoline engine, wherein the emissions treatment system comprises a coated monolith substrate or a the rare earth element containing zeolitic material according to any one of embodiments 1 to 24 and 38.

40. Use of the coated monolith substrate or of the rare earth element containing zeolitic material according to any one of embodiments 1 to 24 and 38 as a molecular sieve, as an adsorbent, for ion-exchange, as a catalyst or a precursor thereof, and/or as a catalyst support or a precursor thereof, preferably as a catalyst or a precursor thereof and/or as a catalyst support or a precursor thereof, more preferably as a catalyst or a precursor thereof, more preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides NO, in exhaust gas from a combustion engine, preferably from a diesel engine or from a lean burn gasoline engine.

EXPERIMENTAL SECTION

Catalyst Characterization

Reference Example 1: Determination of Cation Contents in the Catalyst Materials

The cation contents in the catalysts were determined by Inductively Coupled Plasma Atomic Emission Spectroscopy (ICP-AES, Optima 2000 DV, USA).

Reference Example 2: Determination of the X-Ray Diffraction Patterns of the Zeolitic Materials X-ray diffraction (XRD) analysis was carried out on an X-ray diffractometer (Rigaku D-Max Rotaflex) using Cu Kα radiation (λ=1.5418 Å) in the 2θ range of 2-50° and scan rate of 5°/min. UV-Vis diffuse reflectance spectra were recorded in the range of 190-800 nm on JASCO V550 spectrometer.

Reference Example 3: Determination of the $^{27}$Al MAS NMR Spectra of the Zeolitic Materials All solid-state NMR experiments were performed. $^{27}$Al MAS NMR spectra were acquired at 130.2 MHz on the Agilent DD2-500 MHz spectrometer using a 4 mm MAS NMR probe with a spinning rate of 14 kHz. $^{27}$Al MAS NMR spectra were accumulated for 400 scans with π/12 flip angle, and 1 s pulse delay. Chemical shifts were referenced to 1% Al(NO$_3$)$_3$ aqueous solution.

Reference Example 4: Preparation of Na—SSZ-39 a) Providing the N,N-diethyl-cis-2,6-dimethylpiperidinium hydroxide (DMPOH)

Materials Used:

| | |
|---|---|
| cis-2,6-dimethylpiperidine (Sigma-Aldrich Reagent Co., Ltd.) | 40 g |
| Iodoethane (99%, Aladdin Chemical Co., Ltd.) | 222 g |
| Potassium bicarbonate (KHCO$_3$, AR, 99.5%, Sinopharm Chemical Reagent Co., Ltd.) | 71 g |
| Methanol (Sinopharm Chemical Reagent Co., Ltd.) | 110 g |
| Diethyl ether (AR, 99.5%, Sinopharm Chemical Reagent Co., Ltd.) | 1,000 g |
| Anion-exchange resin (Amberlite IRN-78, OH-form, Thermofisher) | 300 g |

N,N-diethyl-cis-2,6-dimethylpiperidine iodide was synthesized by reacting cis-2,6-dimethylpiperidine, iodoethane, and an excess of KHCO$_3$ in the presence of methanol solvent, followed by refluxing at 70° C. for 4 days. The KHCO$_3$ was filtered and then the solvent and the excess of iodoethane was removed by rotary evaporation. The product was washed with ether. The molecular structure was verified using $^1$H and $^{13}$C nuclear magnetic resonance (NMR). The product was converted from the iodide form to the hydroxide form (denoted as DMPOH) using an anion exchange resin.

b) Preparation of a Zeolitic Material Having Framework Type AEI

Materials Used:

| | |
|---|---|
| Sodium aluminate (NaAlO$_2$, AR, 99%, Sinopharm Chemical Reagent Co., Ltd.) | 0.038 g |
| Deionized water | 4.4 g |
| DMPOH solution (according to a) above; 0.23M in water | 10 g |
| Sodium hydroxide (NaOH, AR, 96%, Sinopharm Chemical Reagent Co., Ltd.) | 0.55 g |
| Colloidal silica (40 weight-% SiO$_2$ in water, Sigma-Aldrich Reagent Co., Ltd.) | 2.95 g |
| AEI seeds (prepared according to Comparative Example 1 hereinabove) | 0.02 g |

NaAlO$_2$ was dissolved in deionized water and the DMPOH solution was then added. After stirring at room temperature for 2 h, NaOH was introduced, followed by addition of the colloidal silica and the AEI seeds. This provided a synthesis mixture with the following molar composition:

1.0 SiO$_2$:0.0083 Al$_2$O$_3$:0.35 Na$_2$O:0.12 DMPOH:44 H$_2$O: 0.017 AEI zeolite seeds The ratio of SiO$_2$:Al$_2$O$_3$ was 120:1. After stirring for 10 min at room temperature, said synthesis mixture was transferred into a Teflon-lined autoclave oven and crystallized at 140° C. for 3 days. After filtering, washing, drying, and calcining at 550° C. for 4 h, the product was obtained, which was designated as a zeolitic material (Si/Al=10) having framework type AEI, as shown by XRD analysis.

Example 1: Preparation of an Yttrium Containing Zeolitic Material Having the AEI Framework Structure Loaded with Copper Na—SSZ-39 with AEI structure as obtained from Reference Example 4 was exchanged to NH$_4$-form with 0.5 M NH$_4$NO$_3$ aqueous solution at 80° C., then filtered, dried and calcined in flow air to get H-AEI. H-AEI was exchanged with 0.002 M Y(NO$_3$)$_3$ aqueous solution (pH=3.5) at 180° C. for 12 h. Thereafter, the zeolite slurry was filtered, washed with deionized water and dried at 110° C. Cu was introduced by the ion-exchange of Y-AEI with 0.016 M aqueous solution of Cu(CH$_3$COO)$_2$ at 50° C. for 4 h. Thereafter, the zeolite slurry was filtered, washed with deionized water, and dried at 110° C. for 12 h. Subsequently, the sample was calcined in muffle oven at 550° C. for 5 h with a ramping rate of 2° C./min.

The resulting catalyst was denoted as 2.3 Cu-1.8 Y-AEI, indicating the Cu and Y contents as determined by ICP, respectively.

Comparative Example 1: Preparation of a Commercial Zeolitic Material Having the AEI Framework Structure Loaded with Copper Na—SSZ-39 with AEI structure as obtained from Reference Example 4 was exchanged to NH$_4$-form with 0.5 M NH$_4$NO$_3$ aqueous solution at 80° C., then filtered, dried and calcined in flow air to get H-AEI. Cu was introduced by the ion-exchange of H-AEI with 0.01M aqueous solution of Cu(CH$_3$COO)$_2$ at 50° C. for 4 h. Thereafter, the zeolite slurry was filtered, washed with deionized water, and dried at 110° C. for 12 h. Subsequently, the sample was calcined in muffle oven at 550° C. for 5 h with a ramping rate of 2° C./min.

The resulting catalyst was denoted as 3.0Cu-AEI, indicating the Cu content as determined by ICP.

Comparative Example 2: Preparation of a Commercial Zeolitic Material Having the CHA Framework Structure Loaded with Copper For comparison, a conventional commercial Na—SSZ-13 zeolite as obtained from organotemplate synthesis (Si/Al=15; prepared according to the procedure described in example 1 of WO 2015/185625 A) was successively ion exchanged with ammonium and copper according to the procedure in Example 1, yet was not loaded with a rare earth element prior to loading with copper for obtaining SSZ-13 with 2.5 wt.-% of copper.

Example 2: Catalyst Testing in the Selective Catalytic Reduction of $NO_x$

Prior to reaction tests, all the catalyst powders were pelletized at 2 MPa, then crushed and sieved to obtain grains between 40 and 60 meshes.

In the tests, catalyst samples were tested in the fresh and aged states. For aging, the respective samples were hydrothermally aged at 800° C. in 10% $H_2O$/air for 16 h. Alternatively, the respective samples were aged at 900° C. in 10% $H_2O$/air for 7 h.

$NH_3$—SCR activity measurements were carried out in a micro fixed-bed quartz reactor (i.d. 6 mm) with 8 channel-gas feeding system for mixing NO, $NH_3$, $C_3H_6$, $O_2$, $SO_2$ $CO_2$, $H_2O$, and $N_2$ at desired concentration. Typically, the reactant gas mixture contains 500 ppm NO, 500 ppm $NH_3$, 10% $O_2$, 5% $H_2O$, 50 ppm $SO_2$ (when required) and balance $N_2$. The total flow rate was 240 ml/min, corresponding to a gas hourly space velocity (GHSV) of about 80,000 $h^{-1}$. NO, $NO_2$, and $N_2O$ contents were monitored continuously using a chemiluminescence analyzer (ECO Physics, Switzerland) and an infrared absorption spectrometer (Sick Maihak, Germany). To avoid errors caused by the conversion of ammonia in the analyzer, an ammonia trap containing phosphoric acid solution was installed upstream. All data were obtained when the SCR reaction reached a steady state at each temperature.

Hydrothermal Stability of Cu-AEI and Cu—Y-AEI

Figure 1:
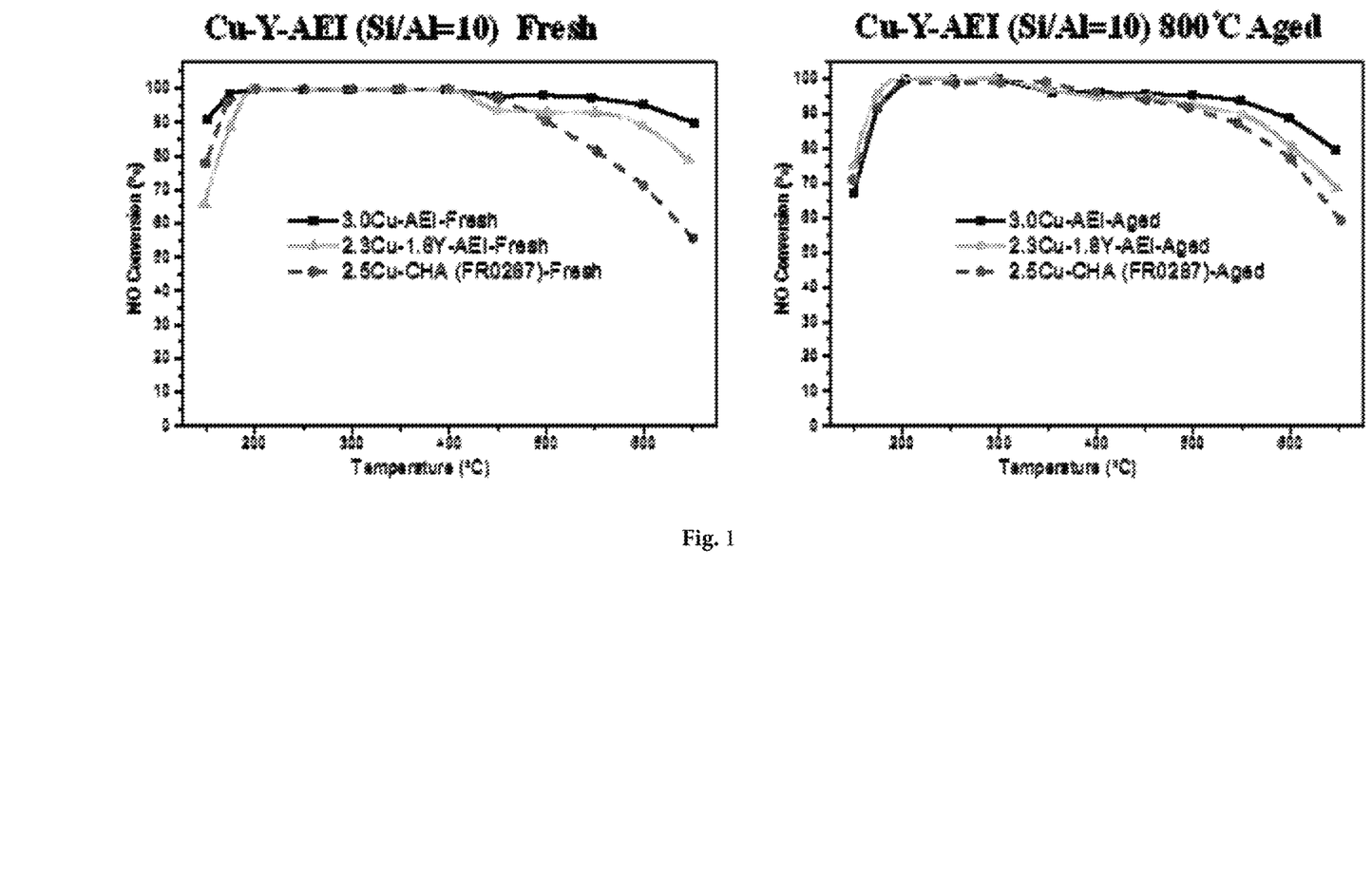
FIG. 1 displays NO conversions as a function of temperature on fresh and 800° C. aged Cu—Y-AEI and Cu-CHA catalysts from Example 1 and Comparative Example 2, respectively, as tested in Example 2. Reaction Conditions: 500 ppm NO, 500 ppm $NH_3$, 10% $O_2$, 5% $H_2O$, balance $N_2$; GHSV=80,000 $h^{-1}$.

Fresh Cu-AEI from Comparative Example 1 shows better SCR performances than the benchmark Cu-CHA from Comparative Example 2 at lower and higher reaction temperatures (see FIG. 1). NO conversion on Cu-AEI is over 90% in the whole reaction temperature window. Addition of rare-earth Y into Cu-AEI decreases the NO conversions at lower and higher temperatures, yet Cu-AEI still exhibits higher NO conversions than the benchmark Cu-CHA at high temperatures. After aging at 800° C., aged Cu-AEI displays lower SCR activities at low-temperatures. However, aged 2.3 Cu-1.8 Y-AEI shows better performances than the benchmark Cu-CHA throughout.

Based on the results displayed in FIG. 1, it must be noted that Cu-AEI performs far better than Cu-CHA both prior to and after aging. Accordingly, as opposed to Cu-CHA, no need whatsoever for hydrothermal stabilization in Cu-AEI when considering its performance in the conversion of NO in $NH_3$—SCR.

Figure 2:
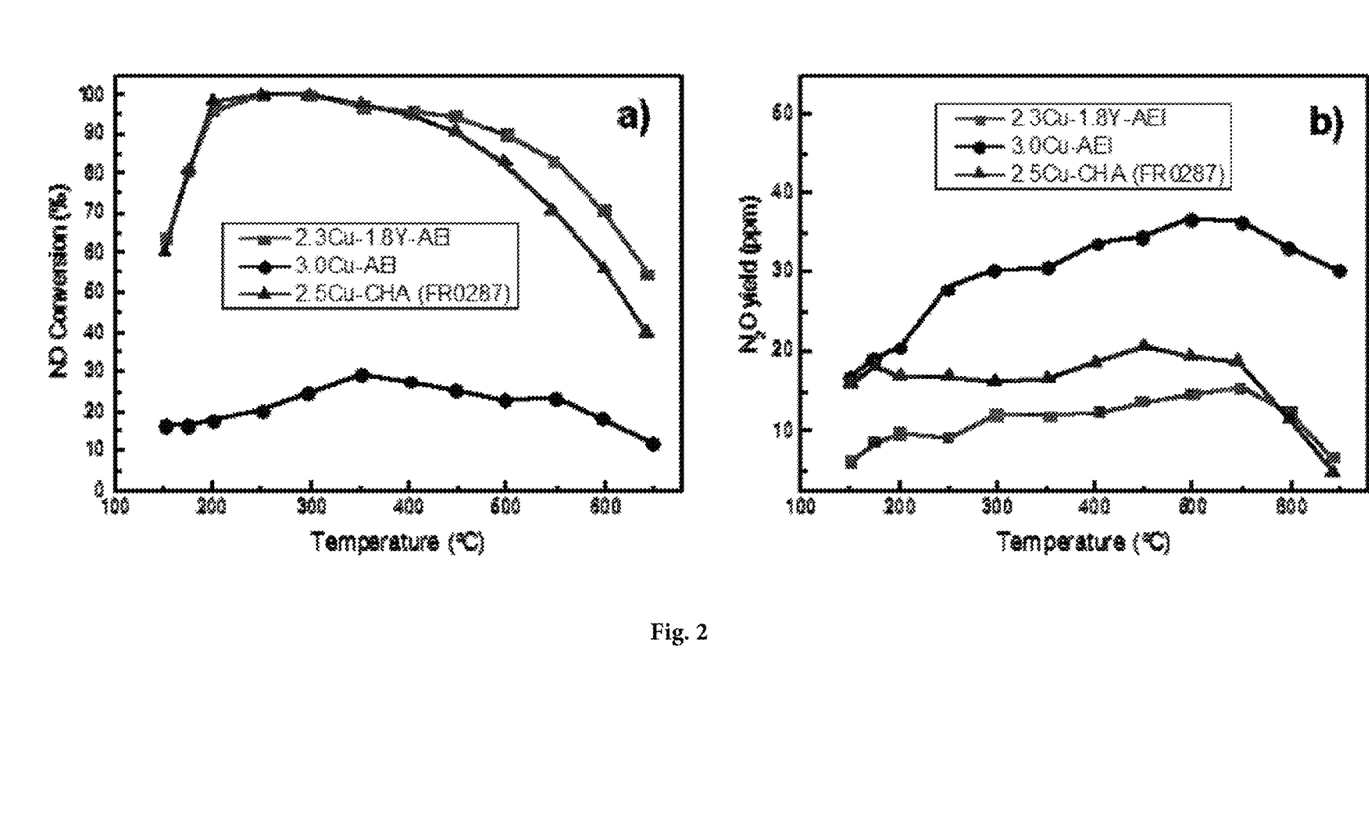
FIG. 2 displays NO conversions (a) and $N_2O$ yields (b) on 900° C. aged Cu—Y-AEI and Cu-CHA catalysts from Example 1 and Comparative Example 2, respectively, as tested in Example 2. Reaction Conditions: 500 ppm NO, 500 ppm $NH_3$, 10% $O_2$, 5% $H_2O$, balance $N_2$; GHSV=80,000 $h^{-1}$.
Figure 3:
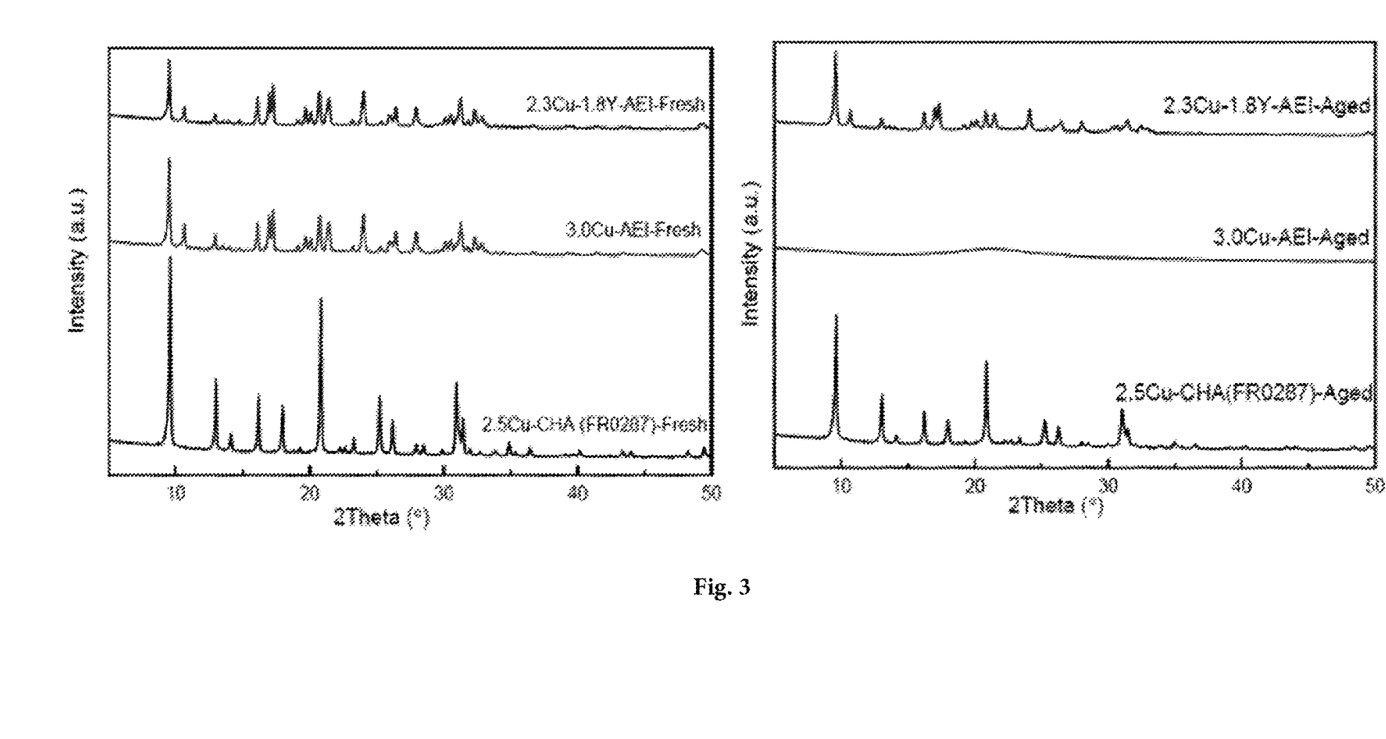
FIG. 3 XRD patterns of fresh and 900° C. aged Cu—Y-AEI and Cu-CHA catalysts from Example 1 and Comparative Example 2, respectively, as aged in Example 2.
Figure 4:
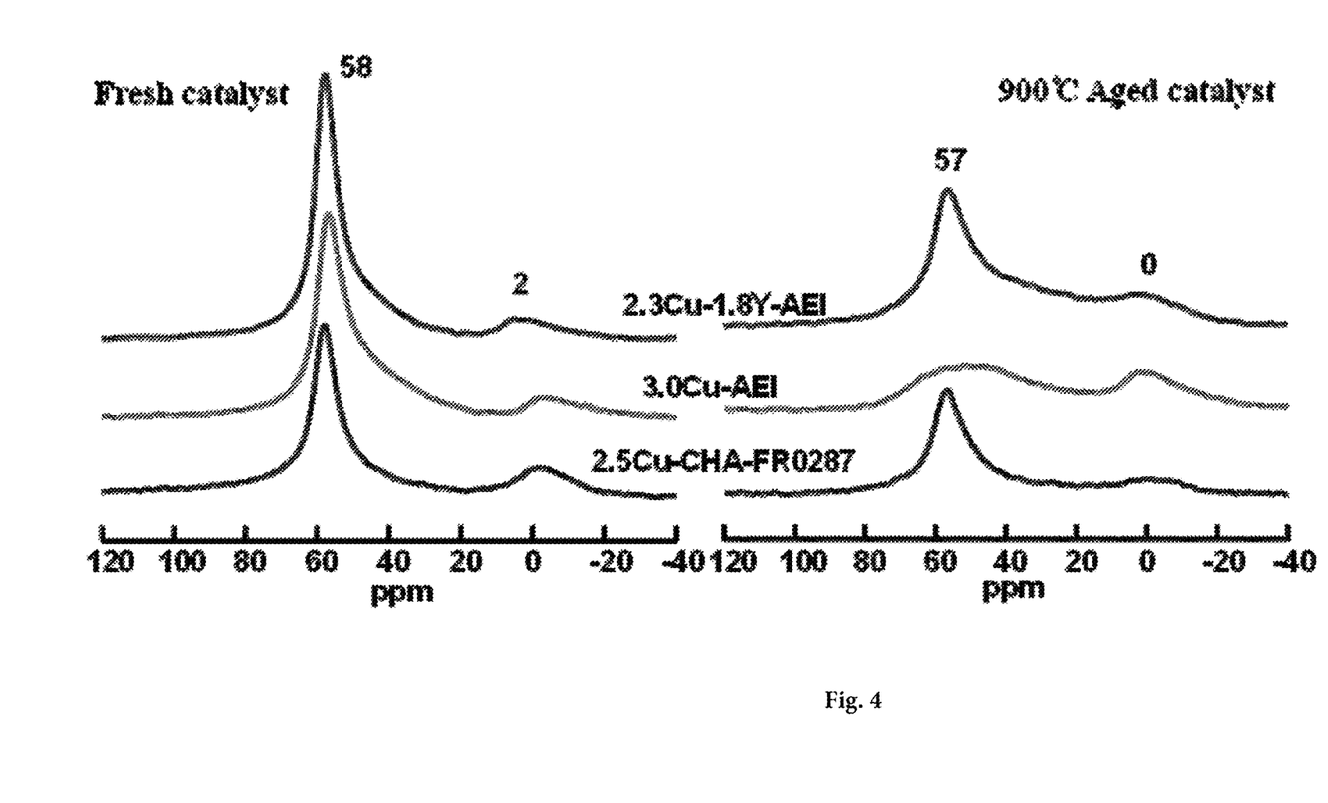
FIG. 4 $^{27}$Al MAS NMR spectra of fresh and 900° C. aged Cu—Y-AEI and Cu-CHA catalysts from Example 1 and Comparative Example 2, respectively, as aged in Example 2.

As may be taken from FIG. 2, however, after hydrothermal aging at 900° C., the NO conversion over Cu-AEI massively drops compared to Cu-CHA. As may be taken form FIGS. 3 and 4 comparing the X-ray diffraction pattern of Cu-CHA and Cu-AEI in the fresh state and after hydrothermal aging at 900° C., said drop in activity is due to a collapse in the framework structure of the material. This finding is highly unexpected in view of the high thermal stability of the material compared to Cu-CHA displayed in FIG. 1, even after extensive hydrothermal aging at 800° C.

Quite surprisingly, however, it has been found that by including yttrium in the material according to Example 1, said sudden collapse from hydrothermal aging may be prevented. Thus, as may be taken from the X-ray diffraction patterns in FIG. 3, the Cu—Y-AEI material from Example 1 maintains its structure even after hydrothermal aging under the same conditions at 900° C. As may be taken from $^{27}Al$ MAS NMR spectra in FIG. 4, after severe hydrothermal aging at 900° C., framework Al can still be maintained in Cu—Y-AEI, but no framework Al in Cu-AEI. Furthermore, as may be taken from FIG. 2, said material displays a high NO conversion activity, which is clearly superior to Cu-CHA at high temperatures. Thus, it has unexpectedly been found that although contrary to Cu-CHA, the catalytic activity of Cu-AEI does not suffer thermal degradation even after hydrothermal aging at high temperatures such as 800° C., the collapse of the framework structure at yet higher temperatures such as at 900° C. may effectively be prevented by ion exchanging yttrium into the zeolitic material.

$SO_2$-Tolerance of Cu—Y-AEI

Figure 5:
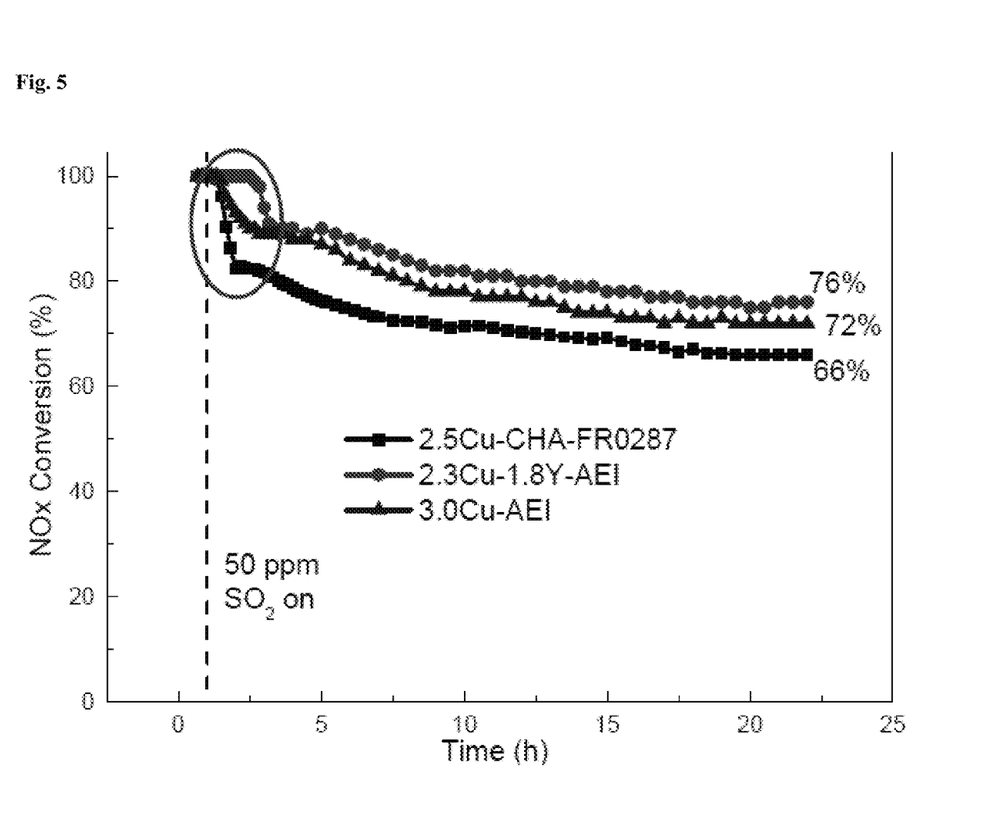
FIG. 5 displays NO conversions as a function of time at 250° C. on Cu-AEI, Cu—Y-AEI and Cu-CHA catalysts from Comparative Example 1, Example 1, and Comparative Example 2, respectively, as tested in Example 2 in the presence of SO$_2$. Reaction conditions: 500 ppm NO, 500 ppm NH$_3$, 10% O2, 5% CO$_2$, 5% H$_2$O, 50 ppm SO$_2$, GHSV=80,000 h$^1$.

FIG. 5 displays the effect of $SO_2$ poisoning on Cu-AEI, Cu—Y-AEI and Cu-CHA catalysts from Comparative Example 1, Example 1, and Comparative Example 2, respectively, as tested in Example 2 in the presence of $SO_2$. From FIG. 5 it is clear that in the presence of $SO_2$ at 250° C., Cu—Y-AEI has the best NO conversion of 76% after running 22 h among the test catalysts. The $SO_2$-resistance capability is: 2.3 Cu-1.8 Y-AEI>Cu-AEI>2.5Cu-CHA (FR0287).

In particular, however, it has quite surprisingly been found that at the beginning of the testing procedure, the Cu—Y-AEI sample shows no inhibition whatsoever during an over an hour of testing, whereas all of the other samples display a net decrease in catalytic activity due to $SO_2$ poisoning already shortly after the beginning of the addition of $SO_s$ to the gas stream (see encircled area in FIG. 5). Accordingly, it has quite unexpectedly been found that the effects of $SO_2$ poisoning are substantially delayed when using Cu—Y-AEI in $NH_3$—SCR.

CITED PRIOR ART

Zhao, Z. et al., *Appl. Catal. B: Environ.* 2017, 217, 421-428
Wang, J. et al., *Ind. Eng. Chem. Res.* 2016, 55, 1174-1182
Iwasaki, M. et al., *Chem. Commun.* 2011, 47, 3966-3968
Shu, Y. et al., *Top Catal* 2015, 58, 334-342
Zhao, Z. et al., *Catal. Sci. Technol.* 2019, 9, 241-251

What is claimed is:

1. A coated monolith substrate comprising a rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, wherein the zeolitic material is supported on the monolith substrate, wherein the zeolitic material displays an $SiO_2:X_2O_3$ molar ratio in the range of from 6 to 200, and wherein the AEI-type framework structure further comprises one or more transition metal elements M selected from the group consisting of Cr, Fe, Co, Ni, Cu, Zn, Pd, and Pt, including combinations of two or more thereof, as counter-ions at the ion exchange sites of the framework structure, wherein the one or more rare earth elements are Y, and wherein the one or more rare earth elements are contained in the zeolitic material in an amount in the range of from 1.5 to 2.2 wt.-%, based on 100 wt.-% of $SiO_2$ contained in the zeolitic material.

2. The coated monolith substrate of claim 1, wherein the monolith substrate is a wall-flow monolith substrate or a flow-through monolith substrate.

3. The coated monolith substrate of claim 1, wherein the zeolitic material is supported on the monolith substrate as, or as a component of, a washcoat layer.

4. A rare earth element containing zeolitic material having an AEI-type framework structure, the framework structure of the zeolitic material comprising $SiO_2$ and $X_2O_3$, wherein X stands for a trivalent element, wherein the zeolitic material contains one or more rare earth elements as counter-ions at the ion exchange sites of the framework structure, wherein the zeolitic material is obtainable and/or obtained according to a process involving the hydrothermal treatment of the rare earth element containing zeolitic material at a temperature in the range of from 400 to 1,000° C., wherein the zeolitic material displays an $SiO_2$:$X_2O_3$ molar ratio in the range of from 6 to 200, and wherein the AEI-type framework structure further comprises one or more transition metal elements M selected from the group consisting of Cr, Fe, Co, Ni, Cu, Zn, Pd, and Pt, including combinations of two or more thereof, as counter-ions at the ion exchange sites of the framework structure, wherein the one or more rare earth elements are Y, and wherein the one or more rare earth elements are contained in the zeolitic material in an amount in the range of from 1.5 to 2.2 wt.-%, based on 100 wt.-% of $SiO_2$ contained in the zeolitic material.

5. The coated monolith substrate according to claim 1 or the zeolitic material of claim 4, wherein the one or more rare earth elements further comprise La, Ce, Pr, Nd, Sm, Eu, Gd, Tb, Dy, Ho, Er, Tm, Yb, Lu, and Sc, including combinations of two or more thereof.

6. The coated monolith substrate according to claim 1 or the zeolitic material of claim 4, wherein X is selected from the group consisting of Al, B, In, Ga, and combinations of two or more thereof.

7. The zeolitic material of claim 4, wherein the zeolitic material is obtainable and/or obtained according to a process involving the hydrothermal treatment of the rare earth element containing zeolitic material in an atmosphere containing from 1 to 25 vol.-% $H_2O$.

8. An emissions treatment system for treating exhaust gas from a combustion engine, wherein the emissions treatment system comprises a coated monolith substrate according to claim 1 or the rare earth element containing zeolitic material according to claim 4.

9. A method of using the coated monolith substrate according to claim 1 or the rare earth element containing zeolitic material according to claim 4 as at least one of a molecular sieve, an adsorbent, a catalyst or a precursor thereof, a catalyst support or a precursor thereof, a catalyst for the selective catalytic reduction (SCR) of nitrogen oxides $NO_x$, an additive in fluid catalytic cracking (FCC) processes, a catalyst in organic conversion reactions, a catalyst in the conversion of alcohols to olefins, or a catalyst in methanol to olefin (MTO) catalysis.

10. A method of using the coated monolith substrate according to claim 1 or the rare earth element containing zeolitic material according to claim 4 for at least one of ion-exchange, storage of $CO_2$, adsorption of $CO_2$, oxidation of $NH_3$, oxidation of $NH_3$ slip in diesel systems, decomposition of $N_2O$, selective catalytic reduction (SCR) of nitrogen oxides $NO_x$, selective catalytic reduction (SCR) of nitrogen oxides $NO_x$ in exhaust gas from a combustion engine, or selective catalytic reduction (SCR) of nitrogen oxides $NO_x$ in exhaust gas from a diesel engine or from a lean burn gasoline engine.

11. A process for the production of a coated monolith substrate comprising a rare earth element containing zeolitic material having an AEI-type framework structure, the framework structure of the zeolitic material comprising $SiO_2$ and $X_2O_3$, wherein X stands for a trivalent element, comprising
   (1) providing a zeolitic material having an AEI-type framework structure, the framework structure of the zeolitic material comprising $SiO_2$ and $X_2O_3$;
   (2) subjecting the zeolitic material provided in (1) to one or more ion exchange procedures with $H^+$ and/or $NH_4^+$;
   (3) subjecting the zeolitic material provided in (1) or obtained in (2) to one or more ion exchange procedures with one or more rare earth elements;
   (4) subjecting the zeolitic material obtained in (3) to one or more ion exchange procedures with one or more transition metal elements M; and
   (5) providing the zeolitic material obtained according to (2) (3) or (4) onto a monolith substrate,
   wherein the zeolitic material is provided as, or as a component of, a washcoat layer onto the monolith substrate, and
   wherein the zeolitic material provided in (1) displays an $SiO_2$:$X_2O_3$ molar ratio in the range of from 6 to 200, and wherein the AEI-type framework structure further comprises one or more transition metal elements M selected from the group consisting of Cr, Fe, Co, Ni, Cu, Zn, Pd, and Pt, including combinations of two or more thereof, as counter-ions at the ion exchange sites of the framework structure,
   wherein in (3) the one or more rare earth elements are Y, and wherein the one or more rare earth elements are contained in the zeolitic material in an amount in the range of from 1.5 to 2.2 wt.-%, based on 100 wt.-% of $SiO_2$ contained in the zeolitic material.

12. The process of claim 11, wherein the zeolitic material provided in (1) displays an $SiO_2$:$X_2O_3$ molar ratio in the range of from 8 to 100.

13. The process of claim 11, wherein X is selected from the group consisting of Al, B, In, Ga, and combinations of two or more thereof.

14. The process of claim 13, wherein X is Al.

15. The process of claim 11, wherein in (3) the one or more rare earth elements further comprise La, Ce, Sm, and Yb, including combinations of two or more thereof.

16. A coated monolith substrate as obtainable and/or obtained according to the process of claim 11.

17. A process for the production of a coated monolith substrate comprising a rare earth element containing zeolitic material having an AEI-type framework structure, the framework structure of the zeolitic material comprising $SiO_2$ and $X_2O_3$, wherein X stands for a trivalent element, comprising
   (1) providing a zeolitic material having an AEI-type framework structure, the framework structure of the zeolitic material comprising $SiO_2$ and $X_2O_3$;
   (2) subjecting the zeolitic material provided in (1) to one or more ion exchange procedures with one or more rare earth elements; and
   (3) providing the zeolitic material obtained according to (2) onto a monolith substrate, wherein the zeolitic material provided in (1) displays an $SiO_2:X_2O_3$ molar ratio in the range of from 6 to 200, and wherein the AEI-type framework structure further comprises one or more transition metal elements M selected from the group consisting of Cr, Fe, Co, Ni, Cu, Zn, Pd, and Pt, including combinations of two or more thereof, as counter-ions at the ion exchange sites of the framework structure, wherein in (2) the one or more rare earth elements are Y, and wherein the one or more rare earth elements are contained in the zeolitic material in an amount in the range of from 1.5 to 2.2 wt.-%, based on 100 wt.-% of $SiO_2$ contained in the zeolitic material.

18. The process of claim 17, wherein the zeolitic material provided in (1) displays an $SiO_2:X_2O_3$ molar ratio in the range of from 8 to 100, or wherein X is selected from the group consisting of Al, B, In, Ga, and combinations of two or more thereof, or wherein in (2) the one or more rare earth elements further comprise are selected from the group consisting of Y, La, Ce, Sm, and Yb, including combinations of two or more thereof.

19. The process of claim 18, wherein X is Al.

* * * * *